United States Patent
Ogawa

(10) Patent No.: US 8,080,628 B2
(45) Date of Patent: Dec. 20, 2011

(54) POLYCARBONATE RESIN AND ELECTROPHOTOGRAPHIC PHOTOSENSITIVE BODY USING THE SAME

(75) Inventor: Noriyoshi Ogawa, Kamisu (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 596 days.

(21) Appl. No.: 12/225,703

(22) PCT Filed: Mar. 28, 2007

(86) PCT No.: PCT/JP2007/056552
§ 371 (c)(1), (2), (4) Date: Sep. 26, 2008

(87) PCT Pub. No.: WO2007/119548
PCT Pub. Date: Oct. 25, 2007

(65) Prior Publication Data
US 2009/0117478 A1    May 7, 2009

(30) Foreign Application Priority Data
Mar. 29, 2006    (JP) .................. 2006-092075

(51) Int. Cl.
 *C08G 64/00*    (2006.01)
 *C08G 63/02*    (2006.01)
(52) U.S. Cl. ......... 528/196; 430/59.5; 430/64; 430/134; 528/26; 528/33; 528/198
(58) Field of Classification Search ................ 430/59.5, 430/64, 134; 528/26, 33, 196, 198
See application file for complete search history.

(56) References Cited

FOREIGN PATENT DOCUMENTS

| JP | 09-216944 | 8/1997 |
|---|---|---|
| JP | 10-130382 | 5/1998 |
| JP | 2002-173529 | 6/2002 |

*Primary Examiner* — Terressa Boykin
(74) *Attorney, Agent, or Firm* — Wenderoth, Lind & Ponack, L.L.P.

(57) ABSTRACT

An electrophotographic photosensitive body which has both good image stability and wear resistance under high temperature and high humidity conditions can be obtained by using a novel polycarbonate resin, which contains a structural unit represented by the general formula (I) below and having a long-chain unsaturated hydrocarbon group having a double bond, as a binder resin for a charge transport layer of an electrophotographic photosensitive body.

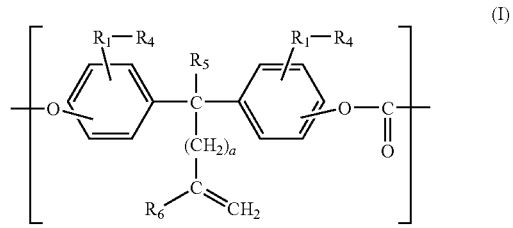

In the formula (I), $R_1$-$R_4$ preferably represent a hydrogen atom or a methyl group, respectively; a represents a number of 7-20; and $R_6$ represents a hydrogen atom, a methyl group or a phenyl group. Particularly preferably, the structural unit represented by the general formula (I) below is derived from 1,1-bis(4-hydroxy-3-methylphenyl)-10-undecene or 1,1-bis(4-hydroxyphenyl)-10-undecene.

16 Claims, No Drawings

POLYCARBONATE RESIN AND ELECTROPHOTOGRAPHIC PHOTOSENSITIVE BODY USING THE SAME

TECHNICAL FIELD

The present invention relates to a novel polycarbonate resin having an unsaturated bond in a side chain and an electrophotographic photosensitive body using the same as a binder resin for a charge transport layer

BACKGROUND ART

Currently, the electrophotographic technology is widely applied for copying machines, laser beam printers (to be referred to as "LBPs" hereinafter), fax machines and the like because of its high-speed processability, high image quality and so on.

As an electrophotographic photosensitive body in the field of this electrophotographic technology, inorganic photoconductive substances such as selenium, selenium/tellurium alloys, selenium/arsenic alloys, cadmium sulfide and the like have mainly been used conventionally.

However, recently it is a general practice to mix an organic photoconductive substance with a binder resin to form a coating film from the viewpoint of toxicity, safety, cost, productivity and the like.

As the binder resin, various thermoplastic resins and thermosetting resins such as polymethylmethacrylate, polystyrene, vinyl polymers such as polyvinyl chloride and copolymers thereof, polycarbonate, polyester, polysulfon, phenoxy resins, epoxy resins and silicone resins have been used.

Electrophotographic photosensitive bodies using any of these various binder resins can be formed into thin films with ease by means of a cast film-forming method and hence are suitable for mass production and can be provided relatively at a low price.

Of these various resins, polycarbonate resins show relatively excellent characteristics and hence are used popularly. For this reason, uses of various polycarbonate resins have been reported.

Among them, a polycarbonate resin derived from 1,1-bis(4-hydroxyphenyl)cyclohexane as a starting monomer is used as a binder resin having excellent solubility with solvents and wear resistance as well as excellent compatibility with organic photoconductive substances (see Patent Document 1).

However, a binder resin having more excellent wear resistance is demanded recently, and a method of using a polycarbonate resin having an unsaturated double bond as a binder resin has been developed (see Patent Document 2).

The technique described in the Patent Document 2, wherein the unsaturated double bond is an allyl group as described in the examples, is to react a polycarbonate resin having the allyl groups with a cross-linking agent such as pentaerythritol-tetra(3-mercaptopropionate) and a photo polymerization initiator to form a cross link so as to improve wear resistance.

While the above technique provides means effective to improve wear resistance, the residual electric potential on the surface of the photosensitive body rises under high temperature and high humidity conditions on the assumption to be used in summer in Japan or in tropical region to produce defective images due to the influence of the cross-linking agent.

Additionally, this technique has such a disadvantage that a defective image is also produced due to the deterioration of sensitivity when a charge transport agent having an unsaturated group such as a stilbene-type agent is used, because the unsaturated group of the charge transport agent reacts with a cross-linking agent under the presence of a photo polymerization initiator or a radical initiator.

Therefore, since a photo polymerization initiator and/or a radical initiator cannot be used for the photosensitive body composition where a stilbene-type charge transport agent is used, wear resistance thereof is as low as a photosensitive body using a conventional binder resin, and hence there is room for improvements.

[Patent Document 1]
Jpn. Pat. Appln. Laid-Open Publication No. 61-62039
[Patent Document 2]
Jpn. Pat. Appln. Laid-Open Publication No. H04-291348

DISCLOSURE OF THE INVENTION

Problems to be Solved by the Invention

The problem to be solved by the present invention is to provide an electrophotographic photosensitive body having both good image stability and wear resistance even under high temperature and high humidity conditions and a novel polycarbonate resin suitable for a binder resin thereof.

Means for Solving the Problems

As a result of the intensive studies to solve the above problems, the present inventors have found that an electrophotographic photosensitive body having good wear resistance and image stability under high temperature and high humidity conditions can be obtained by using a polycarbonate resin, which contains a structural unit having a long-chain unsaturated hydrocarbon group having a double bond, as a binder resin for the electrophotographic photosensitive body, and have accomplished the present invention.

That is, the present invention relates to a polycarbonate resin and an electrophotographic photosensitive body using the same shown below:
1) A polycarbonate resin which contains a structural unit represented by the following general formula (I) and a structural unit represented by the following general formula (II).

[Chemical Formula 1]

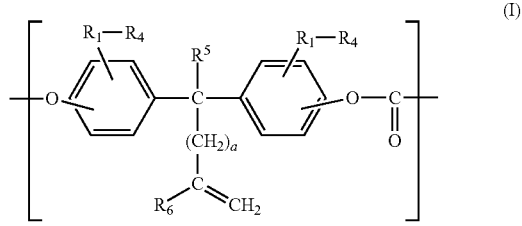

(In the above formula (I), $R_1$ to $R_6$, each independently, represent a group selected from the group consisting of hydrogen, fluorine, chlorine, bromine, iodine, an alkyl group having 1-9 carbon atoms, an aryl group having 6-12 carbon atoms, an alkoxy group having 1-5 carbon atoms, and an aralkyl group having 7-17 carbon atoms. When $R_1$ to $R_6$ are a group containing a carbon atom, the carbon atom can be bonded with a substituent selected from the group consisting of an alkyl group having 1-5 carbon atoms, an alkoxy group having 1-5 carbon atoms, fluorine, chlorine, bromine and iodine. "a" represents an integer of not less than 5.)

[Chemical Formula 2]

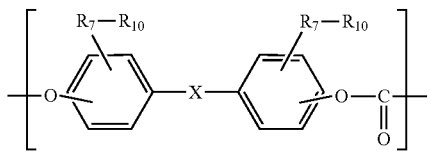
(II)

(In the above formula (II), $R_7$ to $R_{10}$, each independently, represent a group selected from the group consisting of hydrogen, fluorine, chlorine, bromine, iodine, an alkyl group having 1-9 carbon atoms, an aryl group having 6-12 carbon atoms, an alkoxy group having 1-5 carbon atoms, and an aralkyl group having 7-17 carbon atoms. When $R_7$ to $R_{10}$ are a group containing a carbon atom, the carbon atom can be bonded with a substituent selected from the group consisting of an alkyl group having 1-5 carbon atoms, an alkoxy group having 1-5 carbon atoms, fluorine, chlorine, bromine and iodine. "X" represents a divalent group selected from the structures represented by the following formula (III):

[Chemical Formula 3]

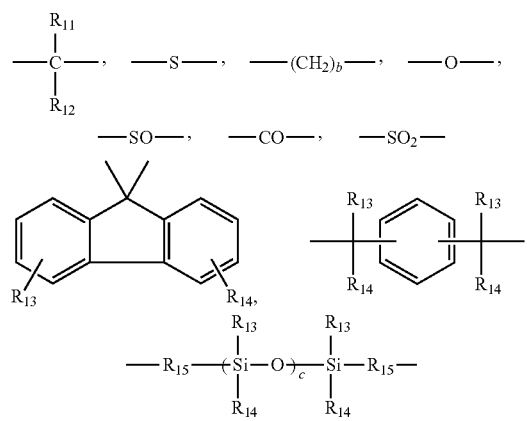
(III)

(In the above formula (III), each of $R_{11}$ and $R_{12}$ represents independently a group selected from the group consisting of hydrogen, fluorine, chlorine, bromine, iodine, an alkyl group having 1-9 carbon atoms, an alkoxy group having 1-5 carbon atoms and an aryl group having 6-12 carbon atoms, or a group forming a carbon ring having 5-12 carbon atoms or a heterocycle having 5 to 12 elements wherein $R_{11}$ and $R_{12}$ are bonded with each other. When $R_{11}$ and $R_{12}$ are a group containing a carbon atom, the carbon atom can be bonded with a substituent selected from the group consisting of an alkyl group having 1-5 carbon atoms, an alkoxy group having 1-5 carbon atoms, fluorine, chlorine, bromine and iodine.

Each of $R_{13}$ and $R_{14}$ independently represents a group selected from the group consisting of hydrogen, fluorine, chlorine, bromine, iodine, an alkyl group having 1-9 carbon atoms, an alkoxy group having 1-5 carbon atoms and an aryl group having 6-12 carbon atoms. When $R_{13}$ and $R_{14}$ are a group containing a carbon atom, the carbon atom can be bonded with a substituent selected from the group consisting of an alkyl group having 1-5 carbon atoms, an alkoxy group having 1-5 carbon atoms, fluorine, chlorine, bromine and iodine. $R_{15}$ represents an alkylene group having 1-9 carbon atoms. "b" represents an integer of 0-20, and "c" represents an integer of 1-500.)

2) The polycarbonate resin according to (1), wherein "a" in said general formula (I) represents 7-20.
3) The polycarbonate resin according to (1) or (2), wherein $R_1$ to $R_4$ in said general formula (I) represent a hydrogen atom or a methyl group.
4) The polycarbonate resin according to any one of (1) to (3), wherein $R_7$ to $R_{10}$ in said general formula (II) represent a hydrogen atom or a methyl group.
5) The polycarbonate resin according to any one of (1) to (4), wherein X in said general formula (II) represents "—($R_{11}$)C($R_{12}$)—", wherein $R_{11}$ and $R_{12}$ represent an alkyl group having 1-5 carbon atoms, an aryl group having 6-12 carbon atoms or a group forming a carbon ring having 5-12 carbon atoms wherein $R_{11}$ and $R_{12}$ are bonded with each other, or "—O—".
6) The polycarbonate resin according to any one of (1) to (5), wherein the amount of said structural unit represented by the general formula (I) is 5-50 mol % based upon the total amount of structural units consisting the polycarbonate resin.
7) The polycarbonate resin according to any one of (1) to (6), wherein the intrinsic viscosity thereof is 0.3-2.0 dl/g.
8) A process for producing a polycarbonate resin according to (1), which comprises a step of reacting bisphenol represented by the following general formula (I') with bisphenol represented by the following general formula (II') and a carbonate-forming compound.

[Chemical Formula 4]

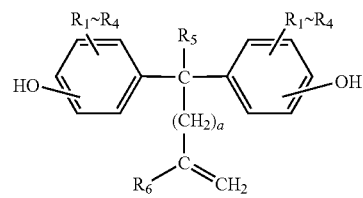
(I')

(In the formula (I'), each of $R_1$ to $R_6$ independently represents a group selected from the group consisting of hydrogen, fluorine, chlorine, bromine, iodine, an alkyl group having 1-9 carbon atoms, an aryl group having 6-12 carbon atoms, an alkoxy group having 1-5 carbon atoms and an aralkyl group having 7-17 carbon atoms. When any of $R_1$ to $R_6$ is a group containing carbon atoms, the carbon atoms may be bonded to a substituent selected from the group consisting of an alkyl group having 1-5 carbon atoms, an alkoxy group having 1-5 carbon atoms, fluorine, chlorine, bromine and iodine. "a" represents an integer of not less than 5.)

[Chemical Formula 5]

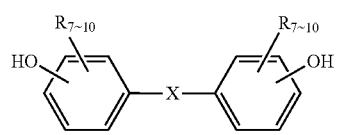
(II')

(In the formula (II'), each of $R_7$ to $R_{10}$ independently represents a group selected from the group consisting of hydrogen, fluorine, chlorine, bromine, iodine, an alkyl group having 1-9 carbon atoms, an aryl group having 6-12 carbon atoms, an alkoxy group having 1-5 carbon atoms and an aralkyl group having 7-17 carbon atoms. When any of $R_7$ to $R_{10}$ is a group containing carbon atoms, the carbon atoms may be bonded to a substituent selected from the group consisting of an alkyl group having 1-5 carbon atoms, an alkoxy group having 1-5 carbon atoms, fluorine, chlorine, bromine and iodine. "X" represents a d divalent group selected from the structures represented by the following formula (III'):

[Chemical Formula 6]

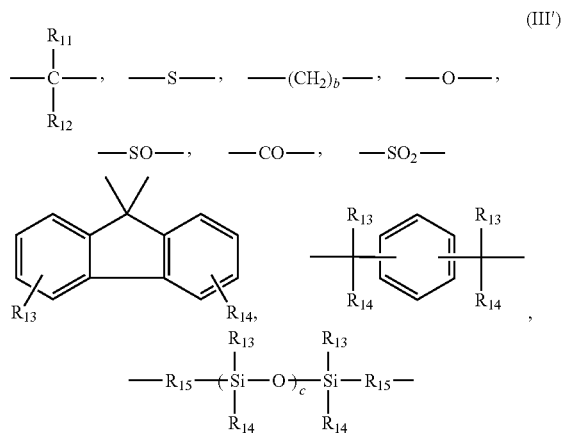

(In the formula (III'), each of $R_{11}$ and $R_{12}$ represents independently a group selected from the group consisting of hydrogen, fluorine, chlorine, bromine, iodine, an alkyl group having 1-9 carbon atoms, an alkoxy group having 1-5 carbon atoms and an aryl group having 6-12 carbon atoms, or a group forming a carbon ring having 5-12 carbon atoms or a heterocycle having 5-12 atoms wherein $R_{11}$ and $R_{12}$ are bonded with each other. When $R_1$, and $R_{12}$ are a group containing a carbon atom, the carbon atom can be bonded with a substituent selected from the group consisting of an alkyl group having 1-5 carbon atoms, an alkoxy group having 1-5 carbon atoms, fluorine, chlorine, bromine and iodine.

Each of $R_{13}$ and $R_{14}$ independently represents a group selected from the group consisting of hydrogen, fluorine, chlorine, bromine, iodine, an alkyl group having 1-9 carbon atoms, an alkoxy group having 1-5 carbon atoms and an aryl group having 6-12 carbon atoms. When $R_{13}$ and $R_{14}$ are a group containing a carbon atom, the carbon atom can be bonded with a substituent selected from the group consisting of an alkyl group having 1-5 carbon atoms, an alkoxy group having 1-5 carbon atoms, fluorine, chlorine, bromine and iodine. $R_{15}$ represents an alkylene group having 1-9 carbon atoms. "b" represents an integer of 0-20, and "c" represents an integer of 1-500.)

9) The process for producing a polycarbonate resin according to (8), wherein said bisphenol represented by the general formula (I') is 1,1-bis(4-hydroxy-3-methylphenyl)-10-undecene or 1,1-bis(4-hydroxyphenyl)-10-undecene.

10) The process for producing a polycarbonate resin according to (8) or (9), wherein said bisphenol represented by the general formula (II') is a compound selected from the group consisting of 2,2-bis(4-hydroxyphenyl)propane, 2,2-bis(4-hydroxy-3-methylphenyl)propane, bis(4-hydroxyphenyl) ether, 1,1-bis(4-hydroxyphenyl)cyclohexane and 1,1-bis(4-hydroxyphenyl)-1-phenylethane.

11) The process for producing a polycarbonate resin according to any one of (8) to (10), wherein said carbonate-forming compound is phosgene.

12) The process for producing a polycarbonate resin according to any one of (8) to (11), wherein the amount of said bisphenol represented by the general formula (I') is 5 to 50 mol % based upon the total amount of bisphenol components.

13) An electrophotographic photosensitive body having a conductive support and a photoconductive layer formed on the conductive support, wherein the polycarbonate resin according to any one of (1) to (7) is used as a binder resin of said photoconductive layer.

14) An electrophotographic photosensitive body having a conductive support, a charge generating layer and a charge transport layer formed on the conductive support, wherein the polycarbonate resin according to any one of (1) to (7) is used as a binder resin of at least said charge transport layer.

15) A process for producing an electrophotographic photosensitive body having a conductive support, a charge generating layer formed on the conductive support and a charge transport layer formed on the charge generating layer, which comprises:

a step of forming a coating layer by coating a solution containing the polycarbonate resin according to any one of (1) to (7) and a charge transport material onto the charge generating layer; and a step of forming a charge transport layer by removing solvents from said coating layer by means of a heat treatment.

16) A process for producing an electrophotographic photosensitive body having a conductive support, a charge generating layer formed on the conductive support and a charge transport layer formed on the charge generating layer, which comprises:

a step of forming a coating layer by coating a solution containing the polycarbonate resin according to any one of (1) to (7), a photo polymerization initiator and a charge transport material having no unsaturated groups onto the charge generating layer; and a step of forming a charge transport layer by curing said coating layer by means of ultraviolet irradiation.

Effects of the Invention

The polycarbonate resin according to the present invention is a novel polycarbonate having a specific long-chain unsaturated hydrocarbon group having a double bond. When said polycarbonate resin is used as a binder resin for the charge transport layer of an electrophotographic photosensitive body, an electrophotographic photosensitive body that scarcely produces a defective image under high temperature and high humidity condition and shows a high wear resistance can be obtained. Particularly, when the charge transport layer is formed by curing by means of ultraviolet irradiation using a photo polymerization initiator in combination with a charge transport agent having no unsaturated groups, significantly high wear resistance can be achieved.

In addition, the polycarbonate resin according to the present invention can be used to form a charge transport layer which scarcely produces a defective image and has excellent wear resistance, even in combination with a stilbene-type charge transport agent which can not be used together with a cross-linking agent because of the reactivity with its unsaturated group. Thus, the present invention can reduce wear of the photosensitive body of a copying machine or a printing machine and has effects to prolong the service life of the photosensitive body and to reduce the frequency of servicing operation.

BEST MODE FOR CARRYING OUT THE INVENTION

1. Polycarbonate Resin

The polycarbonate resin according to the present invention contains a structural unit represented by the general formula (I) (to be referred to as a "structural unit (I)" hereinafter) and a structural unit represented by the general formula (II) (to be referred to as "structural unit (II)" hereinafter).

(1) Structural Unit (I)

The structural unit (I) is represented by the following general formula (I):

[Chemical Formula 7]

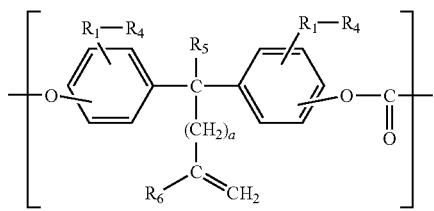

(I)

In the above formula (I), each of $R_1$ to $R_6$ represents independently a group selected from the group consisting of hydrogen, fluorine, chlorine, bromine, iodine, an alkyl group having 1-9 carbon atoms, an aryl group having 6-12 carbon atoms, an alkoxy group having 1-5 carbon atoms, and an aralkyl group having 7-17 carbon atoms. When $R_1$ to $R_6$ are a group containing a carbon atom, the carbon atom can be bonded with a substituent selected from the group consisting of an alkyl group having 1-5 carbon atoms, an alkoxy group having 1-5 carbon atoms, fluorine, chlorine, bromine and iodine.

Among the above $R_1$-$R_6$, each of $R_1$ to $R_4$ is a group to be bonded with an aromatic ring which forms the main bone of the structural unit (I). Each of $R_1$ to $R_4$ is preferably a hydrogen atom, an alkyl group having 1-4 carbon atoms or a phenyl group, and more preferably a hydrogen atom or a methyl group.

$R_5$ is a substituent to be bonded to a carbon atom which forms the main bone of the structural unit (I), preferably a hydrogen atom, a methyl group or a phenyl group, and more preferably a hydrogen atom. $R_6$ is a substituent to be bonded to a carbon atom which forms the main bone of the long-chain unsaturated hydrocarbon group having an unsaturated double bond at the terminal, preferably a hydrogen atom, a methyl group or a phenyl group, and more preferably a hydrogen atom.

In the above general formula (I), "a" represents the length of the carbon chain of the long-chain unsaturated hydrocarbon group having an unsaturated double bond at the terminal. "a" is an integer of 5 or more, preferably an integer of 7-20, more preferably 10. When "a" is too small and hence the carbon chain of the long-chain unsaturated hydrocarbon group is too short, reactivity may be deteriorated. When "a" is too large and hence the carbon chain of the long-chain unsaturated hydrocarbon group is too long, heat resistance may be deteriorated.

(2) Structural Unit (II)

The structural unit (II) is represented by the following general formula (II):

[Chemical Formula 8]

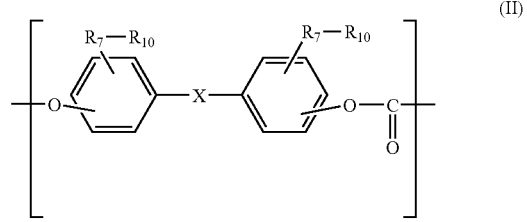

(II)

In the above formula (II), $R_7$ to $R_{10}$ represent each independently a group selected from the group consisting of hydrogen, fluorine, chlorine, bromine, iodine, an alkyl group having 1-9 carbon atoms, an aryl group having 6-12 carbon atoms, an alkoxy group having 1-5 carbon atoms, and an aralkyl group having 7-17 carbon atoms. When $R_7$ to $R_{10}$ are a group containing a carbon atom, the carbon atom can be bonded with a substituent selected from the group consisting of an alkyl group having 1-5 carbon atoms, an alkoxy group having 1-5 carbon atoms, fluorine, chlorine, bromine and iodine.

The above $R_7$ to $R_{10}$ are a group to be bonded to an aromatic ring which forms the main bone of the structural unit (II). $R_7$ to $R_{10}$ are preferably a hydrogen atom, an alkyl group having 1 to 4 carbon atoms or a phenyl group, more preferably a hydrogen atom or a methyl group.

In the general formula (II), "X" represents a divalent group selected from the structures represented by the following formula (III):

[Chemical Formula 9]

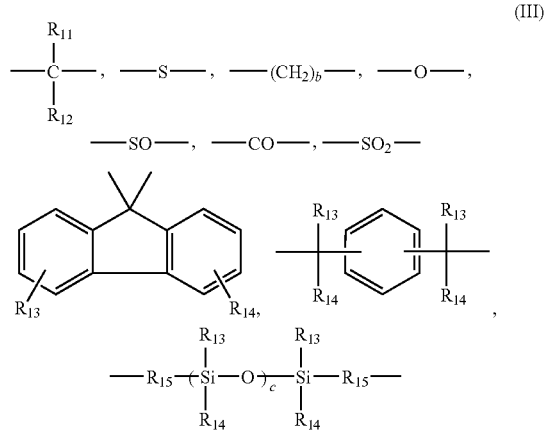

(III)

In the above formula (III), each of $R_{11}$ and $R_{12}$ independently represents a group selected from the group consisting of hydrogen, fluorine, chlorine, bromine, iodine, an alkyl group having 1-9 carbon atoms, an alkoxy group having 1-5 carbon atoms and an aryl group having 6-12 carbon atoms, or $R_{11}$ and $R_{12}$ may be combined with each other to represent a group forming a carbon ring of 5-12 carbon atoms or a heterocyclic ring of 5-12 elements. When either of $R_{11}$ and $R_{12}$ is a group containing one or more carbon atoms, the carbon atoms may be bonded to a substituent selected from a group consisting of an alkyl group having 1-5 carbon atoms, an alkoxy group having 1-5 carbon atoms, fluorine, chlorine, bromine and iodine.

Each of $R_{11}$ and $R_{12}$ is preferably an alkyl group having 1-5 carbon atoms or an aryl group having 6-12 carbon atoms, or $R_{11}$ and $R_{12}$ may be combined with each other to represent a group forming a carbon ring of 5-12 carbon atoms, more preferably a methyl group or a phenyl group, or a group wherein $R_{11}$ and $R_{12}$ is combined with each other to form a cyclohexane ring.

Each of $R_{13}$ and $R_{14}$ independently represents a group selected from the group consisting of hydrogen, fluorine, chlorine, bromine, iodine, an alkyl group having 1-9 carbon atoms, an alkoxy group having 1-5 carbon atoms and an aryl group having 6-12 carbon atoms. When either of $R_{13}$ and $R_{14}$ is a group containing one or more carbon atoms, the carbon atoms may be bonded to a substituent selected from the group consisting of an alkyl group having 1-5 carbon atoms, an alkoxy group having 1-5 carbon atoms, fluorine, chlorine, bromine and iodine. Each of $R_{13}$ and $R_{14}$ is preferably a hydrogen atom, an alkyl group having 1-4 carbon atoms or a phenyl group, more preferably a hydrogen atom or a methyl group.

$R_{15}$ represents an alkylene group having 1-9 carbon atoms, preferably an alkylene group having 2-4 carbon atoms. "b" represents an integer of 0-20, preferably an integer of 0-7. "c" represents an integer of 1-500, preferably an integer of 1-100.

Among the structures represented by the above general formula (III), the preferable structure is "—$(R_{11})C(R_{12})$—" (where each of $R_{11}$ and $R_{12}$ is an alkyl group having 1-5 carbon atoms or an aryl group having 6-12 carbon atoms or $R_{11}$ and $R_{12}$ may be combined with each other to represent a group forming a carbon ring of 5-12 carbon atoms) or "—O—".

(3) Polycarbonate Resin

The polycarbonate resin according to the present invention is a copolymer composed of the structural units comprising the structural unit (I) and the structural unit (II). Preferably, the polycarbonate resin according to the present invention mainly comprises the structural unit (I) and the structural unit (II).

The ratio of the structural unit (I) based upon the total structural units composing said polycarbonate resin is 5 to 50 mol %, preferably 10 to 30 mol %. When the ratio of the structural unit (I) is too low, reactivity may be deteriorated. When the ratio of the structural unit (I) is too high, heat resistance may be deteriorated.

It is particularly preferable that the polycarbonate resin according to the present invention is consisting essentially of the structural unit (I) and the structural unit (II). The preferable ratio of the structural unit (I) to the structural unit (II) is (I):(II)=5-50:95-50 (mol ratio), more preferably 5-30:95-70 (mol ratio). When the ratio of the structural unit (I) is too low, reactivity may be deteriorated. When the ratio of the structural unit (I) is too high, heat resistance may be deteriorated.

Although each of the structural units may be bonded randomly or may be bonded to form a block in the polycarbonate resin according to the present invention, the polycarbonate resin is mainly a random copolymer.

While the molecular weight of the polycarbonate resin according to the present invention is not subjected to any limitation, the intrinsic viscosity thereof is preferably 0.3 to 2.0 dl/g for the purpose that the electrophotographic photosensitive body molded by wet molding can obtain a satisfactory level of film strength. Moreover, considering the importance of the film forming property and the film strength, more preferable intrinsic viscosity is 0.4 to 1.5 dl/g. The film strength may be unsatisfactory when the intrinsic viscosity is too low, whereas the film forming property may be deteriorated when the intrinsic viscosity is too high.

In addition, it is preferable that the polycarbonate resin of the present invention has a glass transition temperature of 100° C. or higher. When the glass transition temperature is lower than 100° C., the polycarbonate resin may be melted at the time of drying after forming a film of the photosensitive body and the film surface may not be equivalent.

The polycarbonate resin according to the present invention can be blended voluntarily with any other resin or resins such as some other polycarbonate, polyester, polystyrene, polyamide, polyurethane, silicone, polymethylmethacrylate, polyoxyphenylene and/or polyvinyl acetate.

When the polycarbonate resin according to the present invention is blended with any other resin or resins within the range that can maintain the intended performance thereof, the content of the polycarbonate resin according to the invention in the blend is preferably not less than 5 wt %.

The polycarbonate resin according to the present invention can be reacted voluntarily with a monomer or monomers such as methyl methacrylate, acrylic acid, vinyl chloride, styrene and/or maleic anhydride to form a copolymer for applications other than an electrophotographic photosensitive body. Such a copolymer can be used as a compatibilizer, a resin modifier and so on.

2. Process for Producing a Polycarbonate Resin

The polycarbonate resin according to the present invention is produced by a process comprising a step of reacting bisphenol represented by the general formula (I') (to be referred to as "bisphenol (I')" hereinafter) with bisphenol represented by the general formula (II') (to be referred to as "bisphenol (II')" hereinafter) and a carbonate-forming compound.

(1) Bisphenol (I')

The bisphenol (I') is represented by the following general formula (I'):

[Chemical Formula 10]

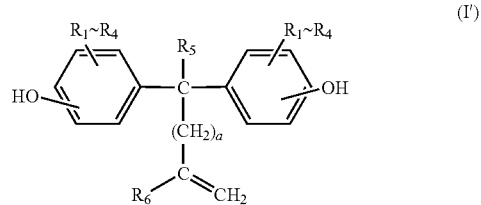

In the above formula (I'), each of $R_1$ to $R_6$ is selected from the same group as defined for $R_1$ to $R_6$ in the above-described general formula (I). Among the above $R_1$ to $R_6$, each of $R_1$ to $R_4$ is a group to be bonded to the aromatic ring of bisphenol (I'), preferably a hydrogen atom, an alkyl group having 1-4 carbon atoms or a phenyl group, more preferably a hydrogen atom or a methyl group. $R_5$ is preferably a hydrogen atom, a methyl group or a phenyl group, more preferably a hydrogen atom. $R_6$ is a substituent to be bonded to the hydrocarbon group of the main body of the long-chain unsaturated hydrocarbon group having a double bond at the terminal, preferably a hydrogen atom, a methyl group or a phenyl group, more preferably a hydrogen atom.

In the above general formula (I'), "a" represents the length of the carbon chain of the long-chain unsaturated hydrocarbon group having a double bond at the terminal. "a" is an integer of 5 or more, preferably an integer of 7-20, more preferably 10. When "a" is too small and hence the carbon chain of the long-chain unsaturated hydrocarbon group is too short, reactivity may be deteriorated. When "a" is too large and hence the carbon chain of the long-chain unsaturated hydrocarbon group is too long, heat resistance may be deteriorated.

Specific examples of bisphenol (I') include 1,1-bis(4-hydroxy-3-methylphenyl)-10-undecene, 1,1-bis(4-hydroxyphenyl)-10-undecene, 1,1-bis(4-hydroxyphenyl)-9-decene, 2,2-bis(4-hydroxyphenyl)-10-undecene, 1,1-bis(4-hydroxyphenyl)-11-dodecene, 1,1-bis(4-hydroxyphenyl)-17-octadecene, and 1,1-bis(4-hydroxyphenyl)-18-nonadecene.

(2) Bisphenol (II')

The bisphenol (II') is represented by the following general formula (II'):

[Chemical Formula 11]

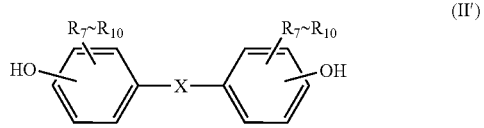

(II')

In the above formula (II'), each of $R_7$ to $R_{10}$ represents a group to be bonded to the aromatic ring of bisphenol (II') and is selected from the same group as defined for $R_7$ to $R_{10}$ in the above described general formula (II). It is preferably a hydrogen atom, an alkyl group having 1-4 carbon atoms or a phenyl group, more preferably a hydrogen atom or a methyl group.

In the general formula (II'), "X" represents a divalent group selected from the structures represented by the following formula (III'):

[Chemical Formula 12]

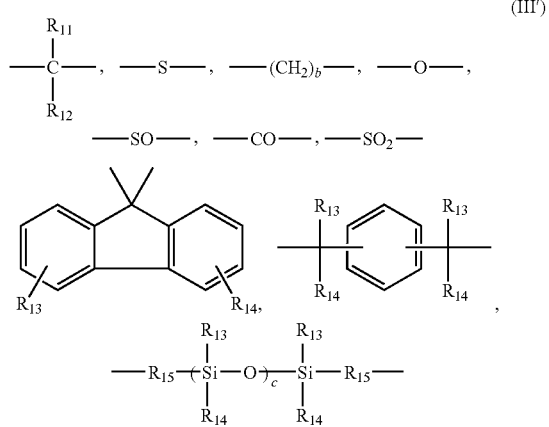

(III')

In the formula (III'), each of $R_{11}$ to $R_{15}$, "b" and "c" represents a group selected from the same group as defined for $R_{11}$ to $R_{15}$, "b" and "c" in the above described formula (III). The preferable structure of the above general formula (III') is "—($R_{11}$)C($R_{12}$)—", where each of $R_{11}$ and $R_{12}$ is an alkyl group having 1-5 carbon atoms or an aryl group having 6-12 carbon atoms or $R_{11}$ and $R_{12}$ may be combined with each other to represent a group forming a carbon ring having 5-12 carbon atoms, or "—O—".

Specific examples of bisphenol (II') of the present invention include 1,1'-biphenyl-4,4'-diol, bis(4-hydroxyphenyl) methane, 1,1-bis(4-hydroxyphenyl)ethane, bis(4-hydroxyphenyl)ether, bis(4-hydroxyphenyl)sulfoxide, bis(4-hydroxyphenyl)sulfide, bis(4-hydroxyphenyl)sulfone, bis(4-hydroxyphenyl)ketone, 2,2-bis(4-hydroxyphenyl)propane, 2,2-bis(4-hydroxy-3-t-butylphenyl)propane, 2,2-bis(4-hydroxy-3-methylphenyl)propane, 1,1-bis(4-hydroxyphenyl)cyclopentane, 1,1-bis(4-hydroxyphenyl)cyclohexane, 2,2-bis(4-hydroxyphenyl)hexafluoropropane, bis(4-hydroxyphenyl)diphenylmethane, 1,1-bis(4-hydroxyphenyl)-1-phenylethane, 9,9-bis(4-hydroxyphenyl) fluorene, 9,9-bis(4-hydroxy-3-methylphenyl)fluorene, α,ω-bis[2-(p-hydroxyphenyl)ethyl]polydimethylsiloxane, α,ω-bis[3-(o-hydroxyphenyl)propyl]polydimethylsiloxane, 4,4'-[1,3-phenylene-bis(1-methylethylidene)]bisphenol and 1,1-bis(4-hydroxhenyl)-1-phenylethane.

Two or more than two of these bisphenols (II') can be used in combination with each other. Particularly, bisphenol (II') is preferably selected from the group consisting of 2,2-bis(4-hydroxyphenyl)propane, 2,2-bis(4-hydroxy-3-methylphenyl)propane, bis(4-hydroxyphenyl)ether, 1,1-bis(4-hydroxyphenyl)cyclohexane and 1,1-bis(4-hydroxyphenyl)-1-phenylethane. More preferably, bisphenol (II') is selected from the group consisting of 2,2-bis(4-hydroxyphenyl)propane and 1,1-bis(4-hydroxyphenyl)cyclohexane.

Bisphenol of the general formula (I') can be obtained by reacting long-chain alkenyl aldehyde, long-chain alkenyl ketone, and monophenols with each other by way of a known method typically in the presence of an acidic catalyst in a solvent or without solvent. Examples of long-chain alkenyl aldehydes include 8-nonenal, 9-decenal, 10-undecenal, 11-dodecenal, 14-pentadecanal, 16-heptadecanal, 9-methyl-9-decenal, 10-methyl-10-undecenal and 11-methyl-11-dodecenal. Examples of long-chain alkenyl ketones include 8-nonen-2-one, 9-decen-2-one, 10-undecen-2-one, 11-dodecen-2-one, 14-pentadecen-2-one, 16-heptadecen-2-one, 9-methyl-9-decen-2-one, 10-methyl-10-undecen-2-one, 11-methyl-11-dodecen-2-one and 10-undecephenone. Examples of monophenols include phenol, o-cresol, p-cresol, o,p-xylenol, o-ethylphenol, o-isopropylphenol, o-tert-butylphenol, 1-tert-butyl-4-methylphenol, o-methoxyphenol, o-fluorophenol, 2-trifluoro-methylphenol and o-phenylphenol.

Commercially available compounds may also be used. Examples of such commercially available compounds include 1,1-bis(4-hydroxy-3-methylphenyl)-10-undecene and 1,1-bis(4-hydroxyphenyl)-10-undecene.

(3) Carbonate Forming Compound

Examples of carbonate forming compounds that can be used for the process for producing a polycarbonate resin according to the present invention include phosgene and bisarylcarbonates such as diphenylcarbonate, di-p-tolylcarbonate, phenyl-p-tolylcarbonate, di-p-chlorophenylcarbonate, dinaphthylcarbonate and the like. Two or more of them can be used in combination with each other.

(4) Process for Production

For the process for producing a polycarbonate resin according to the present invention, any of the known methods for producing polycarbonate from bisphenol and a carbonate forming compound, for example, a direct reaction process of bisphenol and phosgene (a phosgene method) and an ester exchange reaction of bisphenol with bisarylcarbonates (a transesterification method) can be employed.

Of the phosgene method and the transesterification method, the phosgene method is preferable from the viewpoint of the stability of the unsaturated double bond of bisphenol (I'). From the viewpoint of the physical properties of the polycarbonate resin, it is preferable to use bisphenol (I') in the amount of not less than 1 mol %, more preferably 5 to 50 mol %, most preferably 10 to 30 mol % based upon the total amount of the bisphenols to be used as a raw material. When the ratio of bisphenol (I') is too low, reactivity may be deteriorated. When the ratio of bisphenol (I') is too high, heat resistance may be deteriorated.

With the phosgene method, in general, bisphenol (I') and bisphenol (II') are brought into reaction with phosgene under the presence of an acid coupling agent and a solvent. Examples of acid coupling agents include pyridine and hydroxides of alkali metals such as sodium hydroxide, potassium hydroxide and the like. Examples of solvents include methylene chloride and chloroform.

In addition, for the purpose of accelerating the condensation polymerization reaction, it is preferable to add a catalyst such as a tertiary amine such as triethylamine or a quaternary ammonium salt into the reaction system. Moreover, it is also preferable to add monofunctional compounds such as phenol, p-t-butylphenol, p-cumylphenol, a long-chain alkyl-substituted phenol and/or an olefin-substituted phenol as a molecular weight adjuster for adjusting the degree of polymerization. If desired, an antioxidant such as sodium sulfite or hydrosulfite and/or a branching agent such as fluoroglycin or isatin bisphenol can be added by a small amount.

Generally, it is proper to conduct the reaction in a temperature range between 0 and 150° C., preferably between 5 and 40° C. While the reaction time may vary depending on the reaction temperature, it is normally between 0.5 minutes and 10 hours, preferably between 1 minute and 2 hours. It is desirable to keep the pH of the reaction system not below 10 during the reaction.

According to the transesterification method, bisphenol (I'), bisphenol (II') and bisarylcarbonate are mixed and reacted with each other at high temperature under reduced pressure.

The reaction is generally conducted in a temperature range between 150 and 350° C., preferably between 200 and 300° C. The ultimate pressure is preferably reduced to 1 mmHg or less to remove the phenols, which are derived from said bisarylcarbonate and are produced as a result of the transesterification method, from the reaction system by distillation.

While the reaction time varies depending on the reaction temperature and the reduced pressure level, it is generally 1 to 4 hours. The reaction is preferably conducted in an atmosphere of inert gas such as nitrogen or argon. If desired, the reaction may be conducted by adding a molecular weight adjuster, an antioxidant and/or a branching agent.

The polycarbonate resin synthesized from any of these methods can be molded with ease by way of a known wet molding that is generally employed for manufacturing electrophotographic photosensitive bodies such as a solution casting method, a casting method, a spray coating method or a dip coating method. For an electrophotographic photosensitive body molded by way of a wet molding to obtain satisfactory film strength, the preferable intrinsic viscosity is 0.30-2.0 dl/g, and when the film forming properties and the film strength are considered to be important, the more preferable intrinsic viscosity is 0.40-1.5 dl/g.

3. Electrophotographic Photosensitive Body

The electrophotographic photosensitive body according to the present invention has a photoconductive layer that may be realized as a single layer or as a multilayer structure of functionally separated layers formed on a conductive support. Recently, multilayer electrophotographic photosensitive bodies having a charge generating layer for generating charge by exposure to light and a charge transport layer for transporting charge are in the main stream and hence an electrophotographic photosensitive body according to the present invention is preferably of the multilayer type. If necessary, an underlying layer, a protection layer and/or an adhesive layer may be arranged.

As the conductive support in the present invention, a metallic material such as aluminum, stainless steel or nickel, or a polyester film, a phenol resin film or paper having an electrically conductive layer of aluminum, palladium, tin oxide, indium oxide or the like on the surface may be used.

An electrophotographic photosensitive body according to the present invention will be described below on an assumption that it is of the multilayer type having a charge generating layer and a charge transport layer formed on a conductive support.

The charge generating layer of the present invention is formed on a conductive support by means of a known method. As charge generating materials, organic pigments of azoxybenzenes, disazo compounds, trisazo compounds, benzimidazoles, polycyclic quinolines, indigoids, quinacridones, phthalocyanines, perylenes, methines and the like can be used. These charge generating materials may be used in the form of micro particles dispersed in a binder resin.

Examples of the binder resins that can be used for the charge generating layer include a polyvinyl butyral resin, a polyvinyl formal resin, a silicone resin, a polyamide resin, a polyester resin, a polystyrene resin, a polycarbonate resin, a polyvinyl acetate resin, a polyurethane resin, a phenoxy resin, an epoxy resin and various celluloses.

In the electrophotographic photosensitive body according to the present invention, while any of the above-listed resins may be used as the binder resin of the charge generating layer thereof, it is preferable to use a polycarbonate resin or a polyvinyl butyral resin, more preferable to use a polycarbonate resin, most preferable to use the polycarbonate resin according to the present invention.

In the multilayer-type electrophotographic photosensitive body according to the present invention, the polycarbonate resin according to the present invention is used at least as the binder resin of the charge transport layer. Then, as a result, the wear resistance of the electrophotographic photosensitive body is improved to be able to provide an effect of prolonging the service life of the photosensitive body and reduce the frequency of servicing operation.

Examples of the binder resins that can be used for the charge transport layer include the polycarbonate resin according to the present invention and a blend of the polycarbonate resin according to the present invention with some other resin or resins. Examples of such other resins include resins of other polycarbonate, polyester, polystyrene, polyamide, polyurethane, silicone, polymethylmethacrylate, polyoxyphenylene and polyvinyl acetate. When the polycarbonate resin according to the present invention is blended with some other resin or resins within a mixing range that can maintain the specific performance of the polycarbonate resin according to the present invention, the content of the polycarbonate resin according to the present invention in the blend is preferably not less than 10 wt %.

Furthermore, one or more known additives including, for example, an antioxidant, an ultraviolet absorber, a leveling agent, particles of a fluorocarbon resin (trade name "Teflon" and the like), may be added to the binder resin.

The charge transport layer is formed on a charge generating layer by dispersing a charge transport material in a binder resin by means of a known method. Examples of charge transport materials (charge transport agents) to be used in the present invention include, polytetracyanoethylene; fluorenone compounds such as 2,4,7-trinitro-9-fluorenone; nitro compounds such as dinitroanthracene; succinic anhydride; maleic anhydride; dibromo maleic anhydride; triphenylmethane compounds; oxadiazole compounds such as 2,5-di(4-dimethylaminophenyl)-1,3,4-oxadiazole; styryl compounds such as 9-(4-diethylaminostyryl)anthracene; stilbene compounds such as 4-(2,2-bisphenyl-ethene-1-il)triphenylamine and 4-(2,2-bisphenyl-ethen-1-yl)-4',4"-dimethyltriphenylamine; carbazole compounds such as triphenylamine-poly(N-vinylcarbazole); pyrazoline compounds such as 1-phenyl-3-(p-dimethylaminophenyl)pyrazoline; amine derivatives such as 4,4',4"-tris(N,N-diphenylamino)triphenylamine and N,N'-bis(3-methylphenyl)-N,N'-bis(phenyl)benzidine; conjugated unsaturated compounds such as 1,1-bis(4-diethylaminophenyl)-4,4-diphenyl-1,3-butadiene, hydrazone compounds such as 4-(N,N-diethylamino)benzaldehyde-N,N-diphenylhydrazaone; nitrogen-containing cyclic compounds such as indole compounds, oxazole compounds, isooxazole compounds, thiazole compounds, thiadiazole compounds, imidazole compounds, pyrazole compounds, pyrazoline compounds and triazole compounds, and condensed polycyclic compounds. Any of the above listed charge transport materials may be used alone or in combination of two or more of them with each other.

When an electrophotographic photosensitive body according to the present invention is a single layer type having a single photoconductive layer on a conductive support, the polycarbonate resin according to the present invention is used as the binder resin of said photoconductive layer. In this case, the polycarbonate resin according to the present invention may be blended with some other resin or resins and/or one or more known additives may be added as in the case of the binder resin of the charge transport layer of the multilayer electrophotographic photosensitive body. A charge generating material and a charge transport material to be used for the charge generating layer and the charge transport layer of the multilayer electrophotographic photosensitive body can also be used for the single layer electrophotographic photosensitive body.

If necessary, an underlying layer and/or a protection layer may be applied on the electrophotographic photosensitive body according to the present invention. The underlying layer is applied between the conductive support and the charge generating layer for the multilayer type and between the conductive support and the photoconductive layer for the single layer type. It is mainly made of a resin such as phenoxy resins, epoxy resins, polyvinylpyrrolidone, polyvinylalcohol, casein, polyacrylic acid, celluloses, gelatins, starches, polyurethane resins, polyimide resins, polyamide resins and the like. The protection layer is a layer applied on (outside) the charge transport layer for the multilayer type and on (outside) the photoconductive layer for the single layer type. It is mainly made of acryl resins or condensed polysiloxane reins.

4. Process for Manufacturing Electrophotographic Photosensitive Body

The process for manufacturing an electrophotographic photosensitive body according to the invention is adapted to a method of manufacturing a multilayer electrophotographic photosensitive body comprising a conductive support, a charge generating layer formed on the conductive support and a charge transport layer formed on the charge generating layer. It comprises a step of coating a solution containing a polycarbonate resin according to the present invention and a charge transport material onto a charge generating layer and subsequently drying it to form a coating layer (a coating step).

The charge generating layer is formed by coating a binder resin solution, which is prepared by dissolving a charge generating material and a binder resin into an appropriate solvent, onto a conductive support by means of a known method and subsequently drying the solution. The charge transport layer is formed by coating a binder resin solution, which is prepared by dissolving a charge transport material and a binder rein into an appropriate solvent, onto said charge generating layer by means of a known method and subsequently drying the solution.

Solvents that can be used for the purpose of the present invention can be roughly classified into halogen type organic solvents and non-halogen type organic solvents. While less inflammable halogen type solvents are conventionally used, non-halogen type organic solvents are being used to an increasing extent from the viewpoint of safety and environment protection. Therefore, a non-halogen type solvent is preferably used for the purpose of the present invention. For this reason, it is preferable to select the polycarbonate resin according to the present invention so that it can be dissolved in non-halogen type solvents.

Examples of non-halogen type solvents to be used in the present invention include aromatic hydrocarbons such as toluene and xylene, ketones such as acetone, methylethylketone, cyclohexanone and isophoron, ethers such as tetrahydrofuran, 1,4-dioxane, ethylene glycol diethyl ether and ethylcellosolve, esters such as methyl acetate and ethyl acetate as well as dimethyl formamide, dimethyl sulfoxide and diethyl formamide. Examples of halogen type solvents to be used in the present invention include dichloromethane, chloroform, monochlorobenzene, 1,1,1-trichloroethane, monochloroethane and carbon tetrachloride. For the purpose of the present invention, any of the above-listed solvents may be used alone or in combination of two or more of them with each other. Among them, a toluene or tetrahydrofuran solvent is preferable.

When dissolving the binder resin of the present invention into a solvent to form a charge transport layer, it is preferable to prepare a binder resin solution containing the binder resin within a range of 1-40 wt % for use. It is also possible to recycle used electrophotographic photosensitive bodies commercially available by dissolving the charge transport layers of said used electrophotographic photosensitive bodies with a solvent selected from the above listed ones to remove and then forming a new charge transport layer thereon.

The mixing ratio of the charge generating material and the binder resin is preferably within a range between 10:1 and 1:20. The preferable thickness of the charge generating layer is 0.01 to 20 μm, more preferably 0.1 to 2 μm. The mixing ratio of the charge transport material and the binder resin is preferably within a range between 10:1 and 1:10. The preferable thickness of the charge transport layer is 2 to 100 μm, more preferably 5 to 30 μm.

Examples of the methods of coating the solution include a solution casting method, a casting method, a spray coating method, a dip coating method and the like that are normally employed for manufacturing electrophotographic photosensitive bodies.

After coating the solution, the coating layer is dried normally by means of a known method. The drying method of the present invention is not subjected to any particular limitations and an air drying method or some other appropriate methods may be used.

In the process of manufacturing an electrophotographic photosensitive body according to the present invention, after the above described coating step, a charge transport layer is formed by curing the coating layer (a curing step). The coating layer may be cured by way of either a heat treatment or an ultraviolet irradiation.

When an ultraviolet irradiation is employed as the curing method, a charge transport layer can be formed by, after forming a coating layer in the coating step, curing the coating layer by means of treating said coating layer with ultraviolet irradiation. Thus, it is possible to form a charge transport layer having higher wear resistance and strength by accelerating the cross-linking reaction by means of ultraviolet irradiation.

In addition, when stilbene compounds are used as a charge transport agent in the present invention, it is possible to form a charge transport layer having excellent wear resistance without using a photo polymerization initiator. Furthermore, when a charge transport agent having no unsaturated groups such as N,N'-bis(3-methylphenyl)-N,N'-bis(phenyl)benzidine is used as a charge transport agent, it is possible to form a charge transport layer having remarkably improved wear resistance by adding a photo polymerization initiator to a binder resin solution.

Examples of photo polymerization initiators include benzophenone compounds such as benzophenone and Michler's ketone, benzoin compounds such as benzoin ethylether and benzyldimethylketal, diketone compounds such as benzyl and phenylmethoxy diketone, thioxanthone compounds such as 2,4-diethylthioxanthone, quinone compounds such as 2-methylanthraquinone and camphor quinone and N,N-diethylaminobenzene derivatives. Two or more of such compounds may be used in combination with each other. The amount of the photo polymerization initiator added is preferably 0.01-5 wt % based upon the weight of the binder resin according to the present invention.

Sources of irradiation of ultraviolet rays to be used in the present invention include mercury arc lamps, medium pressure mercury arc lamps, high pressure mercury arc lamps, metal halide lamps and the like. The power of the source of ultraviolet rays is between about 0.1 and 1000 W/cm. The irradiation time is normally between 1 second and 1 hour, preferably between 1 second and 5 minutes, although the time may vary depending on the power of the source of ultraviolet rays.

Thus, according to the present invention, in the case of using a stilbene compound as a charge transport agent, it is possible to form a charge transport layer having excellent wear resistance by using a specific polycarbonate resin having a long-chain unsaturated hydrocarbon group having a double bond as a binder resin without using a cross-linking agent. Therefore, it is possible to obtain an electrophotographic photosensitive body that scarcely produces defective images due to a rise of the residual potential on the surface of the photosensitive body even under high temperature and high humidity conditions.

Furthermore, in the case of using a compound having no unsaturated groups as a charge transport agent, it is possible to obtain an electrophotographic photosensitive body having remarkably improved wear resistance by using a cross-linking agent in combination with said charge transport agent.

EXAMPLES

The present invention will be described in more detail below referring to Examples. Note that the scope of the present invention is not limited by the following examples.

Example 1

85.8 g (0.32 mol) of 1,1-bis(4-hydroxyphenyl)cyclohexane manufactured by Honshu Chemical Industry Co., Ltd. In Japan (hereinafter, "BPZ"), 29.3 g (0.08 mol) of 1,1-bis(4-hydroxy-3-methylphenyl)-10-undecene, manufactured by API Corporation (hereinafter, "DMUDB"), and 0.1 g of hydrosulfite were dissolved into 1100 ml of 5 w/w % aqueous solution of sodium hydroxide.

Then, 500 ml of methylene chloride was added to the aqueous solution and 60 g of phosgene was blown into the solution, while stirring the solution and keeping the temperature of the solution to 15° C.

After blowing phosgene in, 1.67 g of p-t-butylphenol, manufactured by Dainippon Ink And Chemicals, Inc. (hereinafter, "PTBP"), was added as a molecular weight adjuster and the solution was stirred intensely to emulsify the reaction solution. After the emulsification, 0.04 ml of triethylamine was added and the emulsion was stirred at 20 to 25° C. for about an hour for polymerization.

After the completion of the polymerization, the reaction solution was separated into an aqueous phase and an organic phase. The organic phase was neutralized by phosphoric acid and was washed repeatedly with water until the electric conductivity of the upper solution (aqueous phase) falls not higher than 10 µS/cm. The obtained polymer solution was dropped into warm water held to 45° C. and the solvent was removed by evaporation to obtain a white powdery precipitate. The obtained precipitate was filtered and dried at 105° C. for 24 hours to obtain powder of the polymer.

The intrinsic viscosity of the solution of the polymer in the solvent of methylene chloride showing a concentration of 0.5 g/dl at 20° C. was 0.48 dl/g. The obtained polymer was analyzed by means of infrared absorption spectrometry. As a result, the absorption due to a carbonyl group was observed at a position near 1,770 cm$^{-1}$ and the absorption due to an ether bond was observed at a position near 1,240 cm$^{-1}$. Thus, it was confirmed that the polymer was a polycarbonate resin having a carbonate bond. The iodine value of the polymer was 12.4 and it was confirmed that an unsaturated group existed there.

Thereafter, a coating solution was prepared by using 50 parts by weight of 4-(2,2-bisphenyl-ethen-1-yl)triphenylamine, manufactured by SYNTEC (hereinafter, "SB type CT agent"), 50 parts by weight of the polycarbonate resin obtained as a result of the above described polymerization, 300 parts by weight of tetrahydrofuran and 50 parts by weight of toluene. The coating solution thus obtained was coated by a dip coating method onto a commercially available LBP photosensitive body (LPA3ETC4: tradename, manufactured by Seiko Epson Corp.) from which the charge transport layer had been removed in advance by tetrahydrofuran. The coated solution was dried in flowing air and then left for drying at 100° C. for 8 hours to produce an about 20 µm-thick charge transport layer. Thus, a multilayer electrophotographic photosensitive body (hereinafter, "OPC") was prepared.

The prepared photosensitive body was then mounted in a commercially available LBP (LBP-8400: tradename, manufactured by Seiko Epson Corp.) and the LBP was driven continuously to print an entirely black solid image on 5,000 sheets of recycled OA paper (LBP-190R-A4B, manufactured by Tochiman Co., Ltd.) in a thermo-hygrostat at 40° C. and 85% RH. Thereafter, an amount of wear of the photosensitive body and the printed images were observed.

Subsequently, a similar coating solution was prepared in the same manner as described above except that the SB type CT agent was replaced by 50 parts by weight of N,N'-bis(3-methylphenyl)-N,N'-bis(phenyl)benzidine manufactured by SYNTEC (hereinafter, "TPD type CT agent"), and further 2-methyl-1[4-(methylthio)phenyl]-2-morpholinopropan-1-on (Irgacure 907: tradename, manufactured by Chiba Specialty Chemicals) was added by 0.5 parts by weight as a photo polymerization initiator. The prepared solution was coated onto the above-mentioned commercially available LBP photosensitive body and dried in flowing air for 30 minutes. Then, the coated solution was cured by irradiating Ultraviolet rays for 5 seconds from a metal halide lamp (MAL-250NL: tradename, manufactured by Japan Storage Battery Co., Ltd.) having an irradiation energy level of 80 W/cm. After the completion of curing, the solution was dried at 100° C. for 8 hours to form an about 20 μm-thick charge transport layer. Thus, an OPC was prepared.

The prepared photosensitive body was then mounted in the commercially available LBP in the same manner described above and the LBP was driven continuously to print 5,000 sheets of recycled OA paper entirely black in a thermo-hygrostat at 40° C. and 85% RH as in the case of the former OPC. Thereafter, an amount of wear of the photosensitive body and the printed images were observed. The obtained results are shown in Table 1.

Example 2

A polycarbonate resin was synthesized in the same manner as in Example 1 except that 73 g (0.32 mol) of 2,2-bis(4-hydroxyphenyl) propane manufactured by Mitsui Chemical, Inc. (hereinafter, "BPA"), was used in place of the BPZ. The intrinsic viscosity of the obtained polycarbonate resin was 0.58 dl/g. The obtained polymer was analyzed by means of infrared absorption spectrometry. As a result, the absorption due to a carbonyl group was observed at a position near 1,770 $cm^{-1}$, and the absorption due to an ether bond was observed at a position near 1,240 $cm^{-1}$, whereby it was confirmed that the polymer was a polycarbonate resin having a carbonate bond. The iodine value of the polymer was 13.8, whereby it was confirmed that an unsaturated group existed there. The synthesized polycarbonate resin was used to mold an electrophotographic photosensitive body and the performances thereof were observed in the same manner as in Example 1. The results are shown in Table 1.

Example 3

A polycarbonate resin was synthesized in the same manner as in Example 1 except that the DMUDB was replaced by 27 g (0.08 mol) of 1,1-bis(4-hydroxyphenyl)-10-undecene manufactured by API Corporation (hereinafter, "UDB"), and 85.8 g of BPZ was replaced by 53.6 g (0.20 mol) of BPZ and 24.2 g (0.12 mol) of bis(4-hydroxyphenyl)ether, manufactured by Dainippon Ink And Chemicals, Inc. (hereinafter, "DHPE"). The intrinsic viscosity of the obtained polycarbonate resin was 0.50 dl/g. The obtained polymer was analyzed by means of infrared absorption spectrometry. As a result, the absorption due to a carbonyl group was observed at a position near 1,770 $cm^{-1}$ and the absorption due to an ether bond was observed at a position near 1,240 $cm^{-1}$, whereby it was confirmed that the polymer was a polycarbonate resin having a carbonate bond. The iodine value of the polymer was 13.4, whereby it was confirmed that an unsaturated group existed there. The synthesized polycarbonate resin was used to mold an electrophotographic photosensitive body and the performances thereof were observed in the same manner as in Example 1. The results are shown in Table 1.

Example 4

A polycarbonate resin was synthesized in the same manner as in Example 1 except that the amount of DMUDB was changed to 43.9 g (0.12 mol), the amount of BPZ was changed to 53.6 g (0.20 mol), the amount of PTBP was changed to 0.8 g and 23.2 g (0.08 mol) of 1,1-bis(4-hydroxyphenyl)-1-phenylethane, manufactured by Honshu Chemical Industry Co., Ltd. (hereinafter, "BPAP"), was added simultaneously with DMUDB. The intrinsic viscosity of the obtained polycarbonate resin was 0.78 dl/g. The obtained polymer was analyzed by means of infrared absorption spectrometry. As a result, the absorption due to a carbonyl group was observed at a position near 1,770 $cm^{-1}$ and the absorption due to an ether bond was observed at a position near 1,240 $cm^{-1}$, whereby it was confirmed that the polymer was a polycarbonate resin having a carbonate bond. The iodine value of the polymer was 18.0, whereby it was confirmed that an unsaturated group existed there. The synthesized polycarbonate resin was used to mold an electrophotographic photosensitive body and the performances thereof were observed in the same manner as in Example 1. The results are shown in Table 1.

Example 5

A polycarbonate resin was synthesized in the same manner as in Example 1 except that the amount of DMUDB was changed to 14.6 g (0.04 mol), and the BPZ was replaced by 45.6 g (0.20 mol) of BPA and 41.0 g (0.16 mol) of 2,2-bis(4-hydroxy-3-methylphenyl)propane, manufactured by API Corporation, (hereinafter, "BPC"). The intrinsic viscosity of the obtained polycarbonate resin was 0.57 dl/g. The obtained polymer was analyzed by means of infrared absorption spectrometry. As a result, the absorption due to a carbonyl group was observed at a position near 1,770 $cm^{-1}$ and the absorption due to an ether bond was observed at a position near 1,240 $cm^{-1}$, whereby it was confirmed that the polymer was a polycarbonate resin having a carbonate bond. The iodine value of the polymer was 7.0, whereby it was confirmed that an unsaturated group existed there. The synthesized polycarbonate resin was used to mold an electrophotographic photosensitive body and the performances thereof were observed in the same manner as in Example 1. The results are shown in Table 1.

Comparative Example 1

An electrophotographic photosensitive body similar to that of Example 1 was molded by using a BPZ type polycarbonate resin (PCZ-200: tradename, manufactured by Mitsubishi Gas Chemical Co., Inc., intrinsic viscosity: 0.47 dl/g) that is a commercially available binder resin for electrophotographic photosensitive bodies in place of the polycarbonate resin of Example 1, and the performances thereof were observed in the same manner as in Example 1. The results are shown in Table 1.

Comparative Example 2

A polycarbonate resin was synthesized in the same manner as in Example 1 except that the DMUDB was replaced by 24.6 g (0.08 mol) of 2,2-bis(4-hydroxy-3-diallylphenyl)propane, manufactured by API Corporation (hereinafter, "DABPA"). The intrinsic viscosity of the obtained polycarbonate resin was 0.49 dl/g. The obtained polymer was analyzed by means of infrared absorption spectrometry. As a result, the absorption due to a carbonyl group was observed at a position near 1,770 $cm^{-1}$ and the absorption due to an ether bond was observed at a position near 1,240 $cm^{-1}$, whereby it was confirmed that the polymer was a polycarbonate resin having a carbonate bond. The iodine value of the polymer was 26.0, whereby it was confirmed that an unsaturated group existed there. The synthesized polycarbonate resin was used to mold an electrophotographic photosensitive body and the performances thereof were observed in the same manner as in Example 1. The results are shown in Table 1.

Comparative Example 3

An electrophotographic photosensitive body similar to that of Example 1 was molded except that the polycarbonate resin of Example 1 was replaced by the polycarbonate resin of Comparative Example 2 and 0.5 parts by weight of pentaerythritoltetraacrylate cross-linking agent, manufactured by DAICEL-CYTEC Company, was added to the coating solution for forming a charge transport layer, and the performances thereof were observed in the same manner as in Example 1. The results are shown in Table 1.

TABLE 1

| | Bisphenols (content; mol %) | | | Intrinsic viscosity (dl/g) | OPC using SB type CT agent (without UV treatment) | | OPC using TPD type CT agent (with UV treatment) | |
|---|---|---|---|---|---|---|---|---|
| | General formula (I') | General formula (II') | others | | Abraded amount (mg) | Image failure | Abraded amount (mg) | Image failure |
| Example | | | | | | | | |
| 1 | DMUDB(20) | BPZ(80) | | 0.48 | 91 | None | 52 | None |
| 2 | DMUDB(20) | BPA(80) | | 0.58 | 96 | None | 62 | None |
| 3 | UDB(20) | DHPE(30) BPZ(50) | | 0.50 | 88 | None | 44 | None |
| 4 | DMUDB(30) | BPAP(20) BPZ(50) | | 0.78 | 103 | None | 67 | None |
| 5 | DMUDB(10) | BPC(40) BPA(50) | | 0.57 | 100 | None | 72 | None |
| Com. Example | | | | | | | | |
| 1 | | BPZ(100) | | 0.47 | 124 | None | 129 | None |
| 2 | | BPZ(80) | DABPA(20) | 0.49 | 132 | None | 100 | None |
| 3 | | BPZ(80), *containing a cross-linking agent | DABPA(20) | 0.49 | 209 | Found | 39 | Found |

Terms in the Table 1 represent as follows:
Bisphenol content: the ratio of the bisphenol based upon the total amount of bisphenols used for synthesizing the polycarbonate resin (mol %)

DMUDB: 1,1-bis(4-hydroxy-3-methylphenyl)-10-undecene
UDB: 1,1-bis(4-hydroxyphenyl)-10-undecene
BPZ: 1,1-bis(hydroxyphenyl)cyclohexane
BPA: 2,2-bis(4-hydroxyphenyl)propane
DHPE: bis(4-hydroxyphenyl)ethane
BPC: 2,2-bis(4-hydroxy-3-methylphenyl)propane
BPAP: 1,1-bis(4-hydroxyphenyl)-1-phenylethane
DABPA: 2,2-bis(4-hydroxy-3-diallylphenyl)propane Cross-linking agent: pentaerythritoltetraacrylate
Intrinsic viscosity: a value observed by means of an Ubbelohde tube at 20° C. with a 0.5% dichloromethane solution and a Haggins constant of 0.45.
Image failure: the result of a visual observation of existence of a image failure having a diameter of not smaller than 1 mm after continuously printing an entirely black solid image on 5,000 A4 size sheets of paper under the condition of high-temperature and humidity at 40° C. and 85% RH.
Abraded amount: the result of measurement of a loss of weight (mg) of the photosensitive body (OPC) after continuously printing an entirely black solid image on 5,000 A4 size sheets of paper under the condition of high-temperature and humidity at 40° C. and 85% RH.

INDUSTRIAL APPLICABILITY

As the utilization of the present invention, it is possible to provide an electrophotographic photosensitive body having excellent image stability and wear resistance even under high temperature and high humidity conditions and also to provide a novel polycarbonate resin that can suitably be used as a binder resin thereof.

The invention claimed is:
1. A polycarbonate resin which contains a structural unit represented by the following formula (I) and a structural unit represented by the following formula (II):

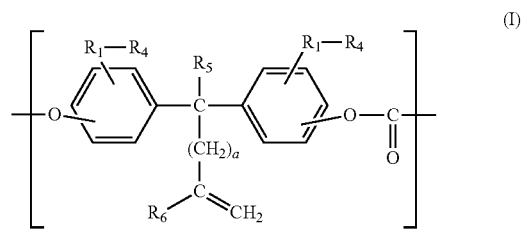

wherein:

in the above formula (I), $R_1$ to $R_6$, each independently, represent a group selected from the group consisting of hydrogen, fluorine, chlorine, bromine, iodine, an alkyl group having 1-9 carbon atoms, an aryl group having 6-12 carbon atoms, an alkoxy group having 1-5 carbon atoms, and an aralkyl group having 7-17 carbon atoms;

when $R_1$ to $R_6$ are a group containing a carbon atom, the carbon atom can be bonded with a substituent selected from the group consisting of an alkyl group having 1-5 carbon atoms, an alkoxy group having 1-5 carbon atoms, fluorine, chlorine, bromine and iodine; and "a" represents an integer of not less than 5;

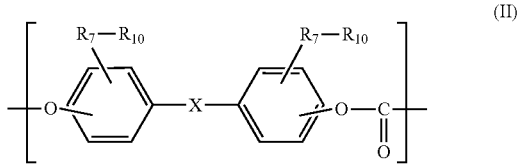

wherein:
in the above formula (II), $R_7$ to $R_{10}$, each independently, represent a group selected from the group consisting of hydrogen, fluorine, chlorine, bromine, iodine, an alkyl group having 1-9 carbon atoms, an aryl group having 6-12 carbon atoms, an alkoxy group having 1-5 carbon atoms, and an aralkyl group having 7-17 carbon atoms;
when $R_7$ to $R_{10}$ are a group containing a carbon atom, the carbon atom can be bonded with a substituent selected from the group consisting of an alkyl group having 1-5 carbon atoms, an alkoxy group having 1-5 carbon atoms, fluorine, chlorine, bromine and iodine; and
"X" represents a divalent group selected from the structures represented by the following formula (III):

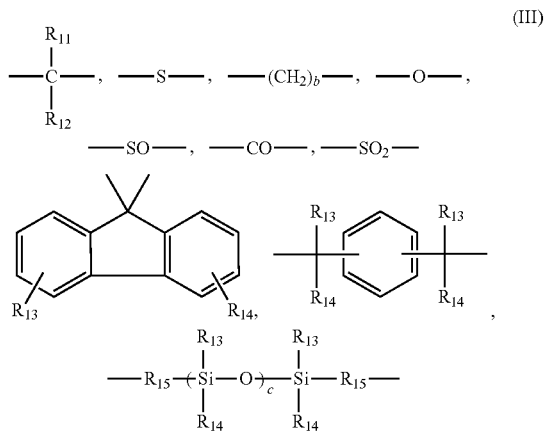

wherein:
in the above formula (III), each of $R_{11}$ and $R_{12}$ represents independently a group selected from the group consisting of hydrogen, fluorine, chlorine, bromine, iodine, an alkyl group having 1-9 carbon atoms, an alkoxy group having 1-5 carbon atoms and an aryl group having 6-12 carbon atoms, or a group forming a carbon ring having 5-12 carbon atoms or a heterocycle having 5 to 12 elements wherein $R_{11}$ and $R_{12}$ are bonded with each other;
when $R_{11}$ and $R_{12}$ are a group containing a carbon atom, the carbon atom can be bonded with a substituent selected from the group consisting of an alkyl group having 1-5 carbon atoms, an alkoxy group having 1-5 carbon atoms, fluorine, chlorine, bromine and iodine;
each of $R_{13}$ and $R_{14}$ independently represents a group selected from the group consisting of hydrogen, fluorine, chlorine, bromine, iodine, an alkyl group having 1-9 carbon atoms, an alkoxy group having 1-5 carbon atoms and an aryl group having 6-12 carbon atoms;
when $R_{13}$ and $R_{14}$ are a group containing a carbon atom, the carbon atom can be bonded with a substituent selected from the group consisting of an alkyl group having 1-5 carbon atoms, an alkoxy group having 1-5 carbon atoms, fluorine, chlorine, bromine and iodine;

$R_{15}$ represents an alkylene group having 1-9 carbon atoms;
"b" represents an integer of 0-20; and
"c" represents an integer of 1-500.

2. The polycarbonate resin according to claim 1, wherein "a" in said formula (I) represents 7-20.

3. The polycarbonate resin according to claim 1, wherein $R_1$ to $R_4$ in said formula (I) represent a hydrogen atom or a methyl group.

4. The polycarbonate resin according to claim 1, wherein $R_7$ to $R_{10}$ in said formula (II) represent a hydrogen atom or a methyl group.

5. The polycarbonate resin according to claim 1, wherein X in said formula (II) represents "—($R_{11}$)C($R_{12}$)—", wherein $R_{11}$ and $R_{12}$ represent an alkyl group having 1-5 carbon atoms, an aryl group having 6-12 carbon atoms or a group forming a carbon ring having 5-12 carbon atoms wherein $R_{11}$ and $R_{12}$ are bonded with each other, or "—O—".

6. The polycarbonate resin according to claim 1, wherein the amount of said structural unit represented by the formula (I) is 5-50 mol % based upon the total amount of structural units consisting the polycarbonate resin.

7. The polycarbonate resin according to claim 1, wherein the intrinsic viscosity thereof is 0.3-2.0 dl/g.

8. A process for producing a polycarbonate resin according to claim 1, which comprises a step of reacting bisphenol represented by the following formula (I') with bisphenol represented by the following formula (II') and a carbonate-forming compound;

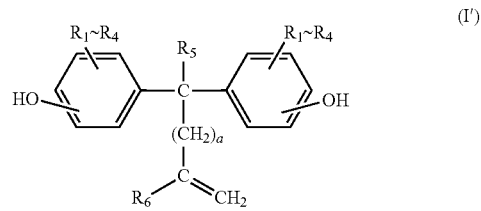

wherein:
in the formula (I'), each of $R_1$ to $R_6$ independently represents a group selected from the group consisting of hydrogen, fluorine, chlorine, bromine, iodine, an alkyl group having 1-9 carbon atoms, an aryl group having 6-12 carbon atoms, an alkoxy group having 1-5 carbon atoms and an aralkyl group having 7-17 carbon atoms;
when any of $R_1$ to $R_6$ is a group containing carbon atoms, the carbon atoms may be bonded to a substituent selected from the group consisting of an alkyl group having 1-5 carbon atoms, an alkoxy group having 1-5 carbon atoms, fluorine, chlorine, bromine and iodine; and,
"a" represents an integer of not less than 5;

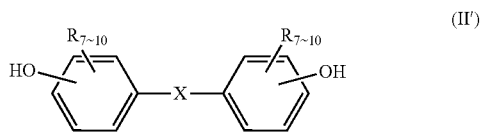

wherein:
in the formula (II'), each of $R_7$ to $R_{10}$ independently represents a group selected from the group consisting of hydrogen, fluorine, chlorine, bromine, iodine, an alkyl group having 1-9 carbon atoms, an aryl group having 6-12 carbon atoms, an alkoxy group having 1-5 carbon atoms and an aralkyl group having 7-17 carbon atoms;

when any of $R_7$ to $R_{10}$ is a group containing carbon atoms, the carbon atoms may be bonded to a substituent selected from the group consisting of an alkyl group having 1-5 carbon atoms, an alkoxy group having 1-5 carbon atoms, fluorine, chlorine, bromine and iodine; and "X" represents a divalent group selected from the structures represented by the following formula (III'):

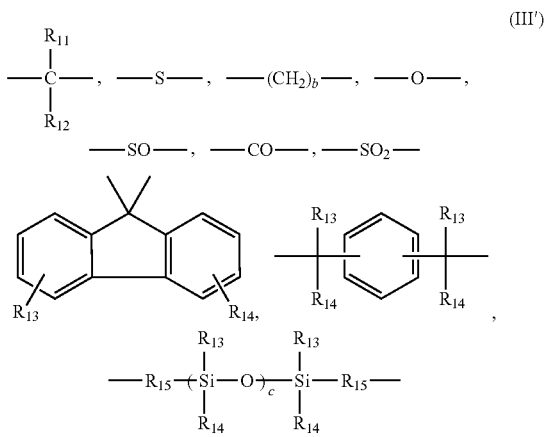

(III')

wherein:

in the formula (III'), each of $R_{11}$ and $R_{12}$ represents independently a group selected from the group consisting of hydrogen, fluorine, chlorine, bromine, iodine, an alkyl group having 1-9 carbon atoms, an alkoxy group having 1-5 carbon atoms and an aryl group having 6-12 carbon atoms, or a group forming a carbon ring having 5-12 carbon atoms or a heterocycle having 5-12 atoms wherein $R_{11}$ and $R_{12}$ are bonded with each other;

when $R_{11}$ and $R_{12}$ are a group containing a carbon atom, the carbon atom can be bonded with a substituent selected from the group consisting of an alkyl group having 1-5 carbon atoms, an alkoxy group having 1-5 carbon atoms, fluorine, chlorine, bromine and iodine;

each of $R_{13}$ and $R_{14}$ independently represents a group selected from the group consisting of hydrogen, fluorine, chlorine, bromine, iodine, an alkyl group having 1-9 carbon atoms, an alkoxy group having 1-5 carbon atoms and an aryl group having 6-12 carbon atoms;

when $R_{13}$ and $R_{14}$ are a group containing a carbon atom, the carbon atom can be bonded with a substituent selected from the group consisting of an alkyl group having 1-5 carbon atoms, an alkoxy group having 1-5 carbon atoms, fluorine, chlorine, bromine and iodine;

$R_{15}$ represents an alkylene group having 1-9 carbon atoms;

"b" represents an integer of 0-20; and

"c" represents an integer of 1-500.

9. The process for producing a polycarbonate resin according to claim 8, wherein said bisphenol represented by the formula (I') is 1,1-bis(4-hydroxy-3-methylphenyl)-10-undecene or 1,1-bis(4-hydroxyphenyl)-10-undecene.

10. The process for producing a polycarbonate resin according to claim 8, wherein said bisphenol represented by the formula (II') is a compound selected from the group consisting of 2,2-bis(4-hydroxyphenyl)propane, 2,2-bis(4-hydroxy-3-methylphenyl)propane, bis(4-hydroxyphenyl)ether, 1,1-bis(4-hydroxyphenyl)cyclohexane and 1,1-bis(4-hydroxyphenyl)-1-phenylethane.

11. The process for producing a polycarbonate resin according to claim 8, wherein said carbonate-forming compound is phosgene.

12. The process for producing a polycarbonate resin according to claim 8, wherein the amount of said bisphenol represented by the formula (I') is 5 to 50 mol % based upon the total amount of bisphenol components.

13. An electrophotographic photosensitive body having a conductive support and a photoconductive layer formed on the conductive support, wherein the polycarbonate resin according to claim 1 is used as a binder resin of said photoconductive layer.

14. An electrophotographic photosensitive body having a conductive support, a charge generating layer and a charge transport layer formed on the conductive support, wherein the polycarbonate resin according to claim 1 is used as a binder resin of at least said charge transport layer.

15. A process for producing an electrophotographic photosensitive body having a conductive support, a charge generating layer formed on the conductive support and a charge transport layer formed on the charge generating layer, which comprises:

a step of forming a coating layer by coating a solution containing the polycarbonate resin according to claim 1 and a charge transport material onto the charge generating layer; and a step of forming a charge transport layer by removing solvents from said coating layer by means of a heat treatment.

16. A process for producing an electrophotographic photosensitive body having a conductive support, a charge generating layer formed on the conductive support and a charge transport layer formed on the charge generating layer, which comprises:

a step of forming a coating layer by coating a solution containing the polycarbonate resin according to claim 1, a photo polymerization initiator and a charge transport material having no unsaturated groups onto the charge generating layer; and a step of forming a charge transport layer by curing said coating layer by means of ultraviolet irradiation.

* * * * *